(12) United States Patent
Oeuvrard

(10) Patent No.: US 8,202,453 B2
(45) Date of Patent: Jun. 19, 2012

(54) METHOD FOR MAKING AN INTERIOR COVERING ELEMENT, AND INTERIOR COVERING ELEMENT WITH NO CENTRAL DEFECT

(75) Inventor: Jean François Oeuvrard, Meru (FR)

(73) Assignee: Faurecia Interieur Industrie, Nanterre (FR)

( * ) Notice: Subject to any disclaimer, the term of this patent is extended or adjusted under 35 U.S.C. 154(b) by 520 days.

(21) Appl. No.: 11/791,822

(22) PCT Filed: Nov. 29, 2005

(86) PCT No.: PCT/FR2005/002961
§ 371 (c)(1), (2), (4) Date: May 30, 2007

(87) PCT Pub. No.: WO2006/058992
PCT Pub. Date: Jun. 8, 2006

(65) Prior Publication Data
US 2008/0044608 A1 Feb. 21, 2008

(30) Foreign Application Priority Data
Nov. 30, 2004 (FR) .................................. 04 12701

(51) Int. Cl.
*B29C 65/00* (2006.01)
(52) U.S. Cl. ........ 264/46.5; 264/275; 264/261; 264/318
(58) Field of Classification Search ................ 264/46.5, 264/275, 261, 318
See application file for complete search history.

(56) References Cited

U.S. PATENT DOCUMENTS

| | | | | |
|---|---|---|---|---|
| 3,219,307 A | * | 11/1965 | Leeds et al. | .................... 425/388 |
| 5,006,288 A | * | 4/1991 | Rhodes et al. | ................ 264/46.6 |
| 5,017,115 A | | 5/1991 | Yanagishita et al. | |
| 5,085,568 A | | 2/1992 | Turgeon et al. | |
| 5,204,042 A | * | 4/1993 | James et al. | ................... 264/257 |
| 2004/0075184 A1 | | 4/2004 | Brown et al. | |

FOREIGN PATENT DOCUMENTS

| | | |
|---|---|---|
| DE | 196 52 690 A1 | 6/1998 |
| EP | 0 282 146 A | 9/1988 |
| GB | 1 073 561 A | 6/1967 |
| GB | 2 201 629 A | 9/1988 |

OTHER PUBLICATIONS

Viertel et al., Translation of DE 196526690, Sep. 1988, Federal Republic of Germany.*

* cited by examiner

*Primary Examiner* — Yogendra Gupta
*Assistant Examiner* — Amjad Abraham
(74) *Attorney, Agent, or Firm* — Young & Thompson

(57) ABSTRACT

The invention concerns a method for making an interior covering element, and an interior covering element with no central defect. The invention concerns a method which consists in providing a soft skin (14) and a support (10), placing the skin (14) and the support (10) on parts of the mould, closing the parts of the mould for completely delimiting a moulding cavity (16) between the skin and the support, and introducing a fluid material designed to form a foam. The making of the support (10) includes placing a catching member (24) proximate the orifice, and the method includes, prior to closing the mould, causing the catching members (26, 24) of the mould and the support to co-operate, such that the support (10) is not spaced apart from the mould. The invention is applicable to motor vehicle interior covering.

12 Claims, 1 Drawing Sheet

METHOD FOR MAKING AN INTERIOR COVERING ELEMENT, AND INTERIOR COVERING ELEMENT WITH NO CENTRAL DEFECT

FIELD OF THE INVENTION

The present invention relates to a method for producing an interior covering element, and to an interior covering element that does not have a defect in its appearance.

BACKGROUND OF THE INVENTION

There are frequently used, especially in motor vehicles, interior covering elements comprising a visible flexible outer skin, an internal support member, and a foam disposed between the skin and the support. Such elements are produced by a closed-mould foaming process, which comprises introducing a fluid material through a nozzle of the mould.

There is already known, according to document U.S. Pat. No. 5,017,115, a method for producing an interior covering element having a visible flexible outer skin, an internal support member formed by a rigid frame, and a foam disposed between the skin and a rear face at which the foam is visible, the rigid frame being fully enclosed between the skin and the foam. The rigid support frame, which is remote from a nozzle for introduction of the fluid material during moulding of the element, is held by a catch device during the moulding operation so that it remains in contact with the skin. Catching is effected in a position remote from the nozzle for introduction of the fluid material.

The invention relates to a different type of interior covering element, in which the visible flexible outer skin and the rigid internal support, which is sometimes called an "insert", together delimit the whole of the cavity in which the foam is located, the foam accordingly not being visible anywhere, except perhaps very locally at an orifice, formed in the support, for introduction of the foaming material. Such elements are produced by a closed-mould foaming process in which the foaming cavity is delimited wholly by the skin and the support and not by a mould.

It has been noted that some interior covering elements so produced have a defect in their appearance in the form of a hollow opposite the location of the orifice for introduction of the foaming material into the support. It was then realised that, on introduction of the fluid foaming material through the orifice adjacent to one mould part, the internal support tends to come away from that mould part. At the end of the introduction, the rigid support tends to assume its original position again and therefore to form a hollow which is visible from the flexible skin side.

It would be possible to provide strong reinforcing ribs around the whole of the orifice in order to prevent the support from being lifted relative to the associated mould part. However, if the part next to the introduction orifice is extensive, the ribs must be very extensive, and they then increase the weight, and therefore the cost, of the rigid support considerably.

SUMMARY OF THE INVENTION

According to the invention, the above-mentioned defect in appearance is eliminated totally, and the problem posed by that defect is therefore resolved, by holding the support close to the orifice for introduction of the fluid material, against the associated mould part. In that manner, the support always keeps a suitable position.

More precisely, the invention relates to a method for producing an interior covering element of the type comprising a flexible outer skin, a rigid internal support, and a foam disposed between the skin and the support, the support being deformable under the action of high forces, which method comprises manufacturing the flexible skin, manufacturing the support, arranging the skin on a first mould part, arranging the support on a second mould part, closing the mould parts in order fully to delimit a moulding cavity between the skin and the support, and introducing a fluid material that is to form a foam into the cavity between the skin and the support, through an orifice in the support by way of a nozzle for introduction of the fluid material that is integral with the second mould part, the configuration of the support near to the orifice for introduction of the fluid material being such that the support tends to come away from the second mould part under the action of the fluid material that is introduced; according to the invention, production of the support comprises providing at least one catch member near to the introduction orifice of the support, the method comprises, prior to closing of the mould parts, providing on the second mould part a catch member complementary to the catch member of the support, and the arrangement of the support on the second mould part comprises causing the catch members of the second mould part and of the support to cooperate, so that the support does not come away from the second mould part during the introduction of the fluid material and the fluid material does not penetrate between the support and the second mould part.

Production of the support preferably comprises the provision of at least two catch members having at least approximately diametrical positions relative to the orifice.

Production of the support preferably comprises the provision of at least one rib that is inclined relative to the surface of the support, the complementary catch member of the second mould part comprising a finger having a tapered end.

The provision on the second mould part of a catch member complementary to the catch member of the support preferably comprises forming the tapered end of the finger with the same inclination as the rib of the support.

The fluid material is preferably introduced in a direction virtually perpendicular to the support, near to the introduction orifice.

The invention relates also to an interior covering element of the type comprising a flexible outer skin, an internal support that is rigid but deformable under the action of high forces, and a foam that is disposed between the skin and the support and that is not visible, of the type comprising an insertion orifice which passes through the support; according to the invention, the element comprises, near to the introduction orifice, at least one catch member.

The support preferably comprises two catch members having at least approximately diametrical positions relative to the orifice.

The catch member of the support preferably comprises a rib that is inclined relative to the surface of the support, and the complementary catch member of the second mould part comprises a finger having a tapered end.

The inclination of the rib of the support and the inclination of the tapered end of the finger are preferably virtually identical.

BRIEF DESCRIPTION OF THE DRAWINGS

Other features and advantages of the invention will be better understood upon reading the following description of exemplary embodiments, which makes reference to the accompanying drawings, in which.

DETAILED DESCRIPTION OF EMBODIMENTS

Figure 1:
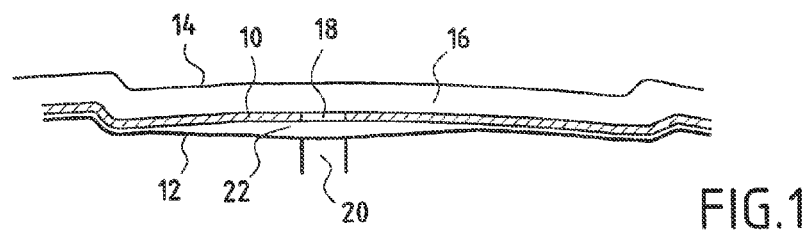
FIG. 1 is a section, in diagrammatic form, showing the effect of the defect corrected by the method of the invention.

FIG. 1 shows an interior covering element support 10 located on a mould part 12, and a flexible skin 14 held by another mould part. The support 10 and the skin 14 delimit between them the whole of a moulding cavity 16 for a fluid material that is to form the foam.

The support 10 has an orifice 18, through which the sectional plane passes, for introduction of the fluid material that is to form the foam, the orifice 18 being located opposite a nozzle 20 for introduction of the fluid material, which nozzle 20 is integral with the mould part 12, and virtually in contact with that mould part.

It has been found that, when the fluid material was introduced in that manner in a direction virtually perpendicular to the support 10, the support 10 tended to come away from the mould part 12 and thus form a space 22 into which the fluid material can penetrate. More precisely, the orifice 18 tends to come out of contact with the mould part around the nozzle 20. Even if the fluid material does not penetrate into that space, when the element is removed from the mould the support tends to regain its original shape, corresponding to the shape of the mould, and to pull the skin (downwards in FIG. 1), forming in the flexible skin 14 a hollow which constitutes a defect in appearance.

Figure 3:
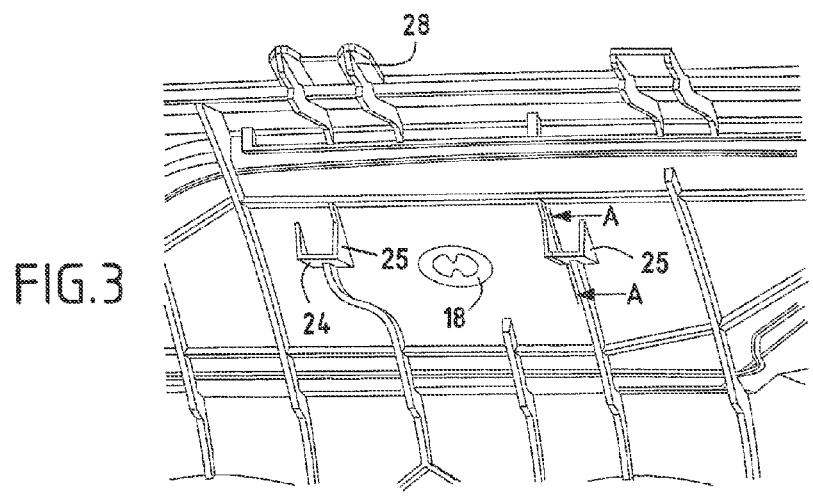
FIG. 3 is a perspective view showing two catch members according to the invention, located on either side of the orifice for passage of the fluid material.
Figure 4:
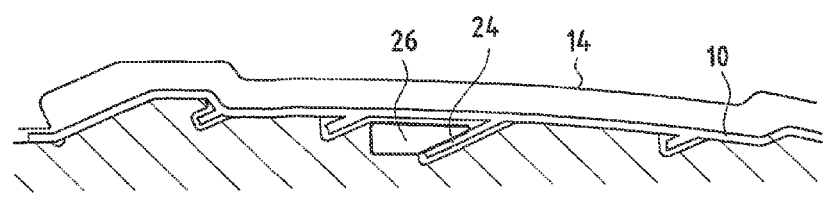
FIG. 4 is a section, analogous to FIG. 2, showing the presence of a catch member of the mould part, in the form of a finger cooperating with a rib of the support.

According to the invention, that defect in appearance, constituted by the hollow in the flexible skin 14, is eliminated because the support comprises a catch member which holds it against the associated mould part. In the example described hereinbelow, the catch member is in the form of at least one additional inclined rib 24 (FIGS. 2 to 4).

Figure 2:
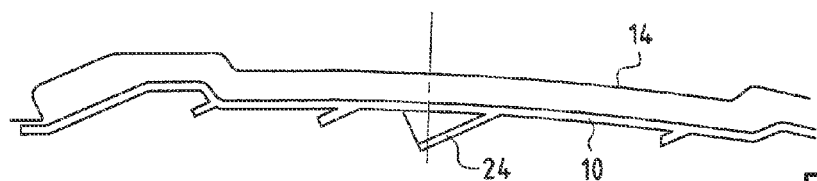
FIG. 2 is a section, in diagrammatic form, along line A-A of FIG. 3, of a support produced according to the invention.

FIG. 2 shows a support 10 comprising a plurality of ribs, in particular a rib 24 according to the invention. It will be noted that the rib 24 is not perpendicular to the support 10 but is very inclined. That inclination is intended to form a receiver for the introduction of a finger 26 integral with the mould. When the finger 26 is introduced beneath the rib 24 and is virtually wedged between the rib and the body of the support 10, the support 10 cannot come away from the mould part. Because that cooperation between the rib 24 and the finger 26 takes place close to the insertion orifice, the forces which tend to lift the support from its mould part have only a weak moment and therefore exert only a reduced torque, which the support 10 is easily able to withstand. As shown in FIG. 3, it is advantageous for the support 10 to comprise two catch members 25 at least having diametrical positions relative to the foam introduction hole 18.

Of course, it would be possible to place a larger number of catch members around the hole 18, but it has been found in practice that two catch members are sufficient for the deformation of the support near to the orifice for introduction of the fluid material to be virtually negligible.

Although the catch member has been shown to be formed by an inclined rib, it is, of course, possible to use other, very different members. For example, the mould could comprise at least one finger passing into an orifice formed in a rib perpendicular to the support, or a ring retaining a finger of the support. In fact, the optimum catch member depends on the particular support.

As shown in FIG. 3, because protruding members 28 are formed on an edge of the support in a given direction, it is desirable, for the sake of ease of removal of the support 10 from the mould, for all the protruding elements to lie in the same direction. For that reason, the ribs 24 used in this example of the invention have an inclination corresponding to that of the members 28.

Of course, various modifications can be made by the person skilled in the art to the method and elements that have just been described solely by way of non-limiting examples, without departing from the scope of the invention.

The invention claimed is:

1. A method for producing an interior covering element comprising a flexible outer skin, a rigid internal support, and a foam disposed between the flexible outer skin and the rigid internal support, the rigid internal support being deformable under action of high forces, said method comprises:

producing the flexible outer skin, said flexible outer skin having an outer surface and an inner surface;

producing the rigid internal support, said rigid internal support having an outer surface and an inner surface;

arranging the flexible outer skin on a first mould part, and arranging the rigid internal support on a second mould part so that the outer surface of the rigid internal support lays on the second mould part;

closing the first and second mould parts in order fully to delimit a moulding cavity between the inner surface of the flexible outer skin and the inner surface of the rigid internal support; and introducing a fluid material that is to form a foam into the moulding cavity between the inner surface of the flexible outer skin and the inner surface of the rigid internal support through an orifice in the rigid internal support by way of a nozzle having an end provided with an outlet for introduction of the fluid material, the nozzle is integral with the second mould part so that the end of the nozzle is facing the outer surface of the rigid internal support, the configuration of the rigid internal support near to the orifice for introduction of the fluid material being such that the rigid internal support tends to come away from the second mould part under the action of the fluid material that is introduced, wherein:

production of the rigid internal support comprises providing at least one catch member on the outer surface of the rigid internal support, near to the orifice of the rigid internal support, the at least one catch member being located in a central area of the outer surface of the rigid internal support, the method comprises, prior to closing of the first and second mould parts, providing on the second mould part a complementary catch member complementary to the catch member of the outer surface of the rigid internal support, the complementary catch member being located in a central area of the second mould part, and arranging the outer surface of the rigid internal support on the second mould part comprises causing the complementary catch member of the second mould part and the catch member of the outer surface of the rigid internal support to cooperate, so that the outer surface of the rigid internal support does not come away from the second mould part during the introduction of the fluid material and the fluid material does not penetrate between the outer surface of the rigid internal support and the second mould part, wherein the catch member comprises a rib, and production of the rigid internal support comprises the provision of at least one said rib that is inclined relative to the outer surface of the rigid internal support, the complementary catch member of the second mould part comprising a finger having a tapered end.

2. The method according to claim 1, wherein production of the rigid internal support comprises the provision of at least two catch members having at least approximately diametrical positions relative to the orifice.

3. The method according to claim 1, wherein the provision on the second mould part of a catch member complementary to the catch member of the rigid internal support comprises forming the tapered end of the finger with the same inclination as the rib of the rigid internal support.

4. The method according to claim 1, wherein the fluid material is introduced in a direction virtually perpendicular to the rigid internal support near to the introduction orifice.

5. The method according to claim 2, wherein the catch member comprises a rib and wherein production of the rigid internal support comprises the provision of at least one said rib that is inclined relative to the surface of the rigid internal support, the complementary catch member of the second mould part comprising a finger having a tapered end.

6. The method according to claim 2, wherein the fluid material is introduced in a direction virtually perpendicular to the rigid internal support near to the introduction orifice.

7. The method according to claim 1, wherein the fluid material is introduced in a direction virtually perpendicular to the rigid internal support near to the introduction orifice.

8. The method according to claim 3, wherein the fluid material is introduced in a direction virtually perpendicular to the rigid internal support near to the introduction orifice.

9. A method for producing an interior covering element comprising a flexible outer skin, a rigid internal support, and a foam disposed between the flexible outer skin and the rigid internal support, said method comprises:
   producing the flexible outer skin, said flexible outer skin having an outer surface and an inner surface;
   producing the rigid internal support, said rigid internal support having an outer surface and an inner surface, said rigid support having an orifice and a catch member near the orifice, said catch member being on the outer second surface of the rigid internal support and the catch member being located in a central area of the rigid internal support;
   arranging the flexible outer skin on a first mould part, and arranging the rigid internal support on a second mould part so that the outer surface of the rigid internal support lays on the second mould part, the second mould part having a complementary catch member complementary to the catch member of the rigid internal support, the complementary catch member being located in a central area of the second mould part;
   closing the first and second mould parts in order to fully delimit a moulding cavity between the flexible outer skin and the rigid internal support;
   introducing a fluid material that forms the foam into the moulding cavity between the inner surface of the flexible outer skin and the inner surface of the rigid internal support through the orifice in the rigid internal support using a nozzle integral with the second mould part, the fluid material introduced in a direction with an outlet of the nozzle virtually perpendicular to the outer surface of the rigid internal support near to the orifice; and
   arranging the outer surface of the rigid internal support on the second mould part to cause the complementary catch member of the second mould part and the catch member of the outer surface of the rigid internal support to engage each other, so that the outer surface of the rigid internal support does not come away from the second mould part in a direction of fluid introduction when introducing the fluid material and so that the fluid material does not penetrate between the outer surface of the rigid internal support and the second mould part,
   wherein the complementary catch member of the second mould part comprises a finger having a tapered end, and
   wherein the catch member comprises a rib that is inclined relative to the outer surface of the rigid internal support to form a receiver for introduction of the finger, said tapered end of the finger engaging the rib with the finger introduced beneath the rib and wedged between the rib and a main body of the rigid internal support thereby preventing deformation and the rigid internal support from coming away from the second mould part during introduction of the fluid material from pressure applied in the central part in the perpendicular direction.

10. The method according to claim 9, wherein producing the rigid internal support comprises forming at least two catch members having at least approximately diametrical positions relative to the orifice.

11. The method of claim 1, wherein said producing steps provides that the inclination of the rib of the rigid internal support and the corresponding inclination of the tapered end of the finger are virtually identical so that the shape of the rib and the finger maintain support on the second mould part to facilitate arrangement of the rigid internal support in the second mould with the tapered end of the finger guiding the rigid internal support towards an arrangement in the second mould with the finger introduced beneath the rib, wedged between the rib and a main body of the rigid internal support thereby preventing the rigid internal support from coming away from the second mould part during introduction of the fluid material.

12. The method of claim 9, wherein, said producing steps provides an inclination of the rib of the rigid internal support and a corresponding inclination of the tapered end of the finger are virtually identical.

* * * * *